United States Patent [19]

Humlong

[11] 4,043,688
[45] Aug. 23, 1977

[54] BICYCLE STEM

[75] Inventor: Robert F. Humlong, Maysville, Ky.

[73] Assignee: Wald Manufacturing Company, Inc., Maysville, Ky.

[21] Appl. No.: 616,265

[22] Filed: Sept. 24, 1975

[51] Int. Cl.² .................................................. F16G 11/00
[52] U.S. Cl. ...................................... 403/209; 403/191; 403/237; 74/551.1
[58] Field of Search ............................... 74/551.1, 551.6; 403/191, 209, 234, 237, 236, 290, 347, 352, 367

[56] References Cited

U.S. PATENT DOCUMENTS

| 1,787,017 | 12/1930 | Paul | 403/191 |
| 2,133,010 | 10/1938 | Barry | 74/551.1 |
| 3,361,455 | 1/1968 | Hussey et al. | 403/191 |
| 3,425,722 | 2/1969 | McCauley | 403/42 |
| 3,722,930 | 3/1973 | Humlong | 74/551.6 X |

Primary Examiner—Wayne L. Shedd
Attorney, Agent, or Firm—J. Warren Kinney, Jr.

[57] ABSTRACT

A bicycle handlebar stem is provided with a throat which is in open communication with the loop thereof in which the central, knurled portion of a handlebar is received. The width of the throat is sufficiently wide to accommodate the passage of the transverse strut or brace bar disposed in spanning relationship with, and between, the risers of a handlebar while the loop of the stem is advanced along the handlebar riser toward the central, knurled portion thereof.

10 Claims, 18 Drawing Figures

U.S. Patent   Aug. 23, 1977   Sheet 1 of 2   4,043,688
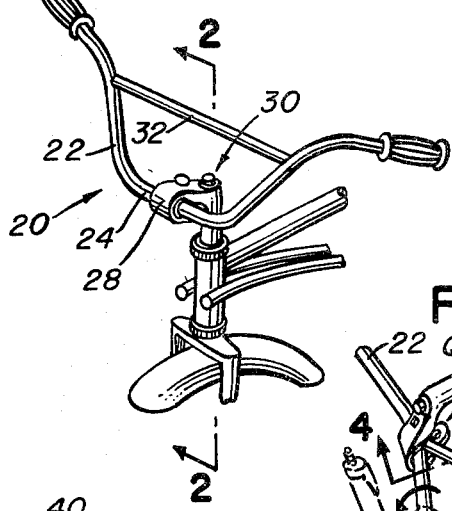
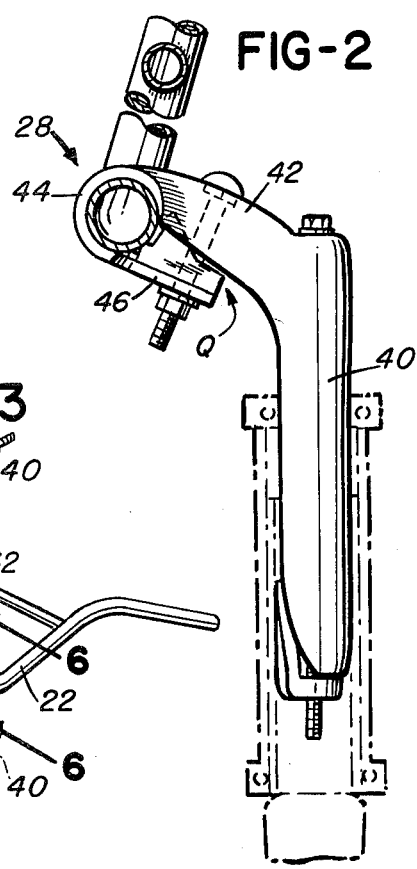
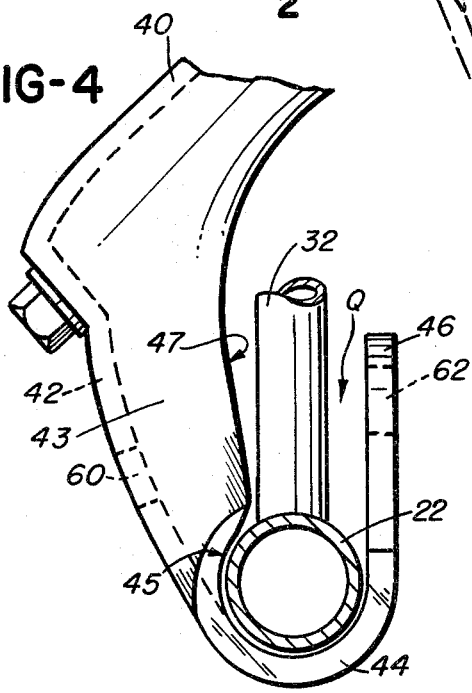
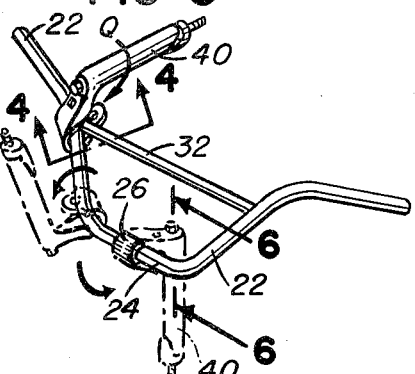
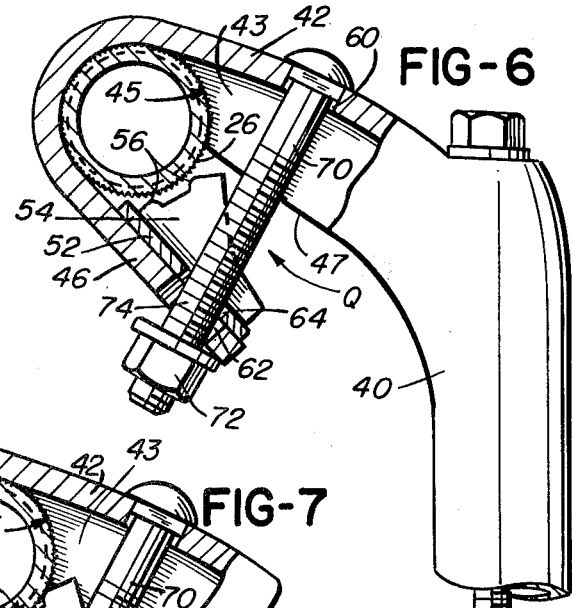
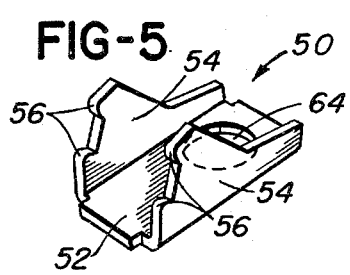
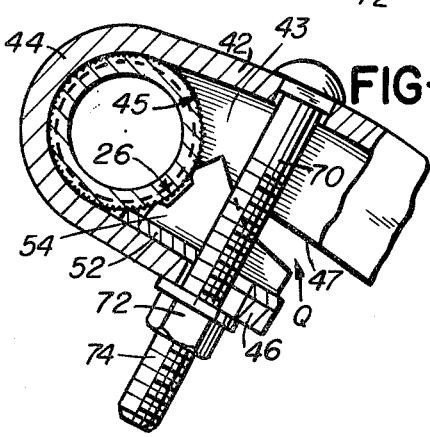

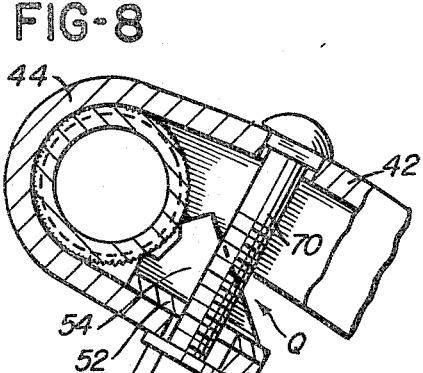
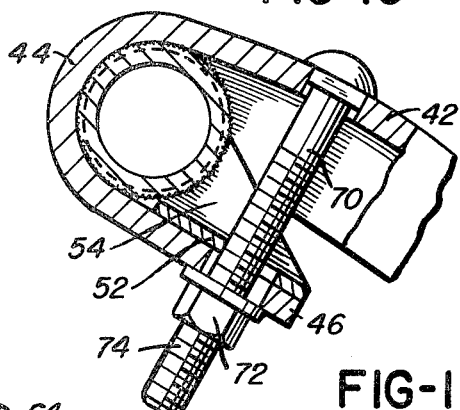
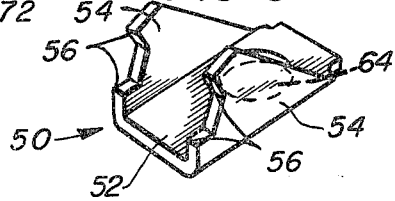
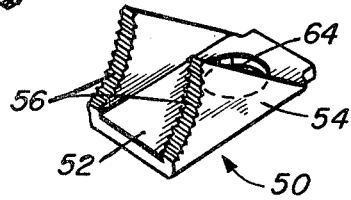
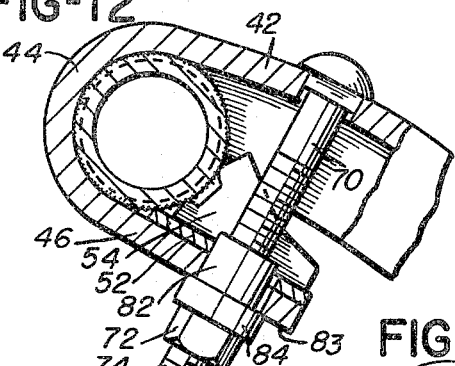
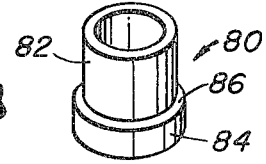
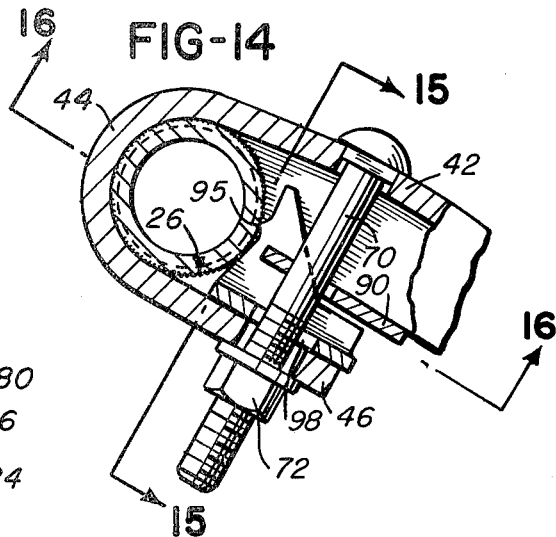
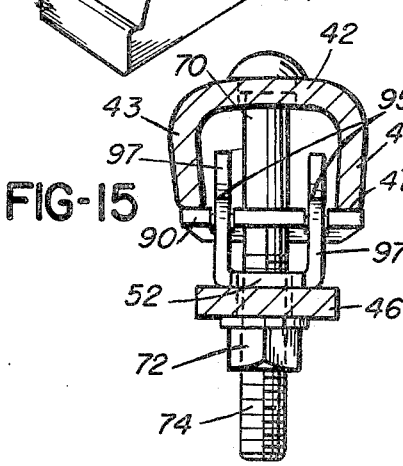
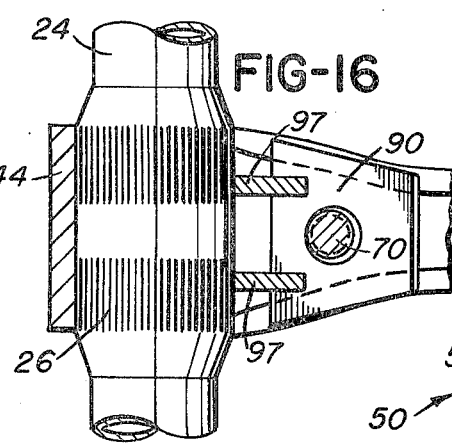
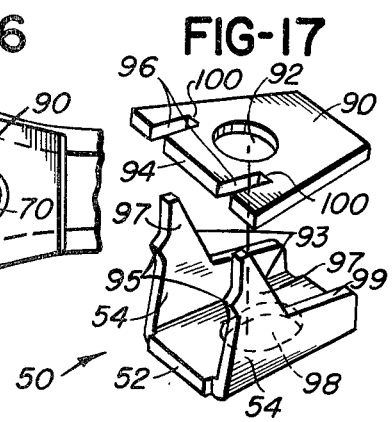

4,043,688

BICYCLE STEM

BACKGROUND OF THE INVENTION

1. Field of the Invention

The field of the invention relates to bicycle stems and, in particular, to a unitary bicycle stem which is uniquely adapted to accommodate a bicycle handlebar of the type which includes a transverse strut or brace bar which spans the risers thereof.

2. Description of the Prior Art

The Hussey U.S. Pat. No. 3,361,455 discloses a bicycle stem which includes a tubular neck portion having an outer free end reversibly bent upon itself to form a clamping head having a circular aperture to receive a handlebar, a clamping lug loosely disposed in said tubular neck portion having a pivot portion at one end, and a bolt in said free end connecting with the other end of the lug for moving it into the circular aperture to clampingly engage the central, mounting portion of a handlebar. The bolt does not extend through the upper and lower legs of the loop-defining portion of the stem, but rather through the lower leg and the clamping lug which is disposed between the inner and outer legs.

The Schrimshaw U.S. Pat. No. 2,856,214 discloses a shaft clamp which comprises means for preventing the endwise, axial movement of a shaft relative to a pair of laterally spaced, shaft-receptive apertures in a support member.

The following patents also relate to bicycle stems: R. R. Hussey U.S. Pat. No. 3,385,615; Barry U.S. Pat. No. 2,133,010; McCauley U.S. Pat. Nos. 3,425,622, 2,487,661 and applicant's own U.S. Pat. No. 3,722,661, assigned to the assignee of this application.

SUMMARY OF THE INVENTION

The field of the invention relates to stems, and in particular, a bicycle stem for a handlebar of the type which includes a pair of risers which extend from opposite ends of an elongate, central, knurled mounting section having a transverse strut or brace bar spanning said risers.

One piece bicycle stems, that is, bicycle stems which are fabricated from a single blank of material which is formed to provide an elongate barrel portion having an upper end which terminates in a loop defined by an upper, an outer, and a lower leg, wherein the lower leg is disposed in spaced relationship with respect to the upper leg for defining therewith a throat in open communication with the loop, are adapted to be associated with the centrally disposed, knurled portion of a bicycle handlebar by introducing an end of the handlebar riser into the loop of the stem and thereafter sliding the loop along the riser for positioning the knurled portion of the handlebar within the loop of the stem. When thus positioned, the loop of the stem is tightened into the knurled portion of the hnadlebar by tightening a bolt which extends through the upper and lower legs of the stem for drawing the lower leg toward the upper leg.

The dimensions of the throat opening and the relationship between the upper and lower legs of the conventional bicycle stem are such as to make it extremely difficult, if not impossible, to pass the transverse strut or brace bar through the throat as the loop of the stem is being advanced axially along a riser for positioning the central, knurled portion of the handlebar interiorly of the loop of the stem.

Once a bicycle stem has been fabricated and finished, the throat cannot be safely enlarged or widened by forcing the lower leg from the upper leg, since to do so will not only seriously distort the loop and leg, but such movement of the loop and/or lower leg will produce and induce undesirable areas of stress.

The stem of the subject invention is directed to a bicycle stem wherein the relationship of the upper, outer and lower loop-defining legs are initially fabricated in such a manner as to provide an open throat between the upper and lower legs which is in open communication with the loop, and which throat is so dimensioned as to readily accommodate the transverse strut or brace bar of a handlebar as the loop of the stem is being advanced axially along the riser toward the knurled portion of a handlebar.

After the loop of the stem has thus been associated with the knurled portion of the handlebar, a locking member, having a forward bearing surface is placed in the throat between the upper and lower legs thereof, said locking member having a bolt-receptive aperture therethrough through which the bolt, which extends through the upper and lower legs of the stem, projects. By tightening upon a nut carried by the bolt, the lower leg is advanced toward the upper leg and concurrently therewith the bearing surface of the locking member is advanced into abutting engagement with the knurled portion of the handlebar in such a manner as to securely lock the handlebar relative to the stem.

BRIEF DESCRIPTION OF THE DRAWINGS

FIG. 1 is a partial perspective view of the upper forward portion of a bicycle, the stem of which embodies the teachings of the present invention.

FIG. 2 is a view taken on line 2—2 of FIG. 1.

FIG. 3 is a perspective view illustrating the manner in which a stem of the present invention is adapted to be associated with a handle bar having a transverse strut or brace bar spanning the risers.

FIG. 4 is an enlarged view taken on line 4—4 of FIG. 3.

FIG. 5 is a perspective view of a locking member which comprises a detail of the present invention.

FIG. 6 is a view, partly in section, illustrating the relationship of the lower leg of the stem-loop and the locking member before they have been advanced into locking relationship with the central knurled portion of the handlebar.

FIG. 7 is a view similar to FIG. 6 showing the relationship of the parts with the knurled portion of the handlebar in locked relationship.

FIG. 8. is a view similar to FIG. 7 illustrating a first modification of the locking member.

FIG. 9 is a perspective view of the locking member of FIG. 8.

FIG. 10 is a view similar to FIG. 7 illustrating a second modification of the locking member.

FIG. 11 is a perspective view of the locking member of FIG. 10.

FIG. 12 is a view similar to FIG. 7 illustrating the use of a bushing in association with the bolt-receptive opening, a lock member and the lower leg of the stem loop.

FIG. 13 is a perspective view of the bushing of FIG. 12.

FIG. 14 is a view, similar to FIG. 7 illustrating a fourth modification of the locking member.

FIG. 15 is a view taken on line 15—15 of FIG. 14.

FIG. 16 is a view taken on line 16—16 of FIG. 15.

FIG. 17 is a perspective view of the locking member of FIG. 14.

FIG. 18 is a perspective view of a solid locking member.

PREFERRED EMBODIMENTS OF THE INVENTION

With particular reference to FIG. 1, the numeral 20 denotes generally a bicycle handlebar of the type which includes a pair of risers 22 which extend from opposite ends of an elongate, central, mounting section 24, which includes a centrally disposed knurled portion 26, which is adapted to be received within and engaged by the forwardly projecting U-shaped loop 28 of bicycle stem denoted generally by the numeral 30. A transverse strut or brace bar 32 is fixedly secured to and in spanning relationship with risers 22.

The presence of the transverse strut or brace bar 32 presents a problem when loop 28 of the bicycle stem is associated with the central portion 24 of the handlebar assembly of FIGS. 1 and 3 since it is customary to introduce the free outer end of a riser through loop 28 after which the loop is advanced, that is, slid along the riser until the central, knurled portion 26 of the handlebar is disposed within the loop.

The bicycle stem is fabricated from a single blank of material, whereby to include an elongate barrel portion 40, the upper end of which terminates in a forwardly projecting U-shaped loop 28 defined by an upper leg 42, an outer leg 44 and a lower leg 46, disposed in spaced relationship with respect to the upper leg for defining therewith an open throat Q, note FIGS. 4, 6, and 7.

The outer wall 42 includes a pair of integral, laterally spaced, depending side walls 43, each of which terminate in a forwardly-facing, arcuate, bearing surface 45 and lower substantially planar edge 47.

The numeral 50 denotes generally a locking member having a bottom wall 52, the lower surface of which is adapted to rest upon the upper surface of lower leg 46. In the embodiment illustrated in FIGS. 5, 9, 11 and 17, the locking member includes a pair of laterally spaced, upstanding side walls 54, each of which terminate in a forwardly-facing bearing surface 56. In the preferred embodiment of the invention, the locking member, and particularly the projecting portions 56 of the bearing surfaces are hardened whereby to cut into and resist deformation by reason of engagement with knurled portion 26 of a handlebar.

Bolt-receptive apertures 60, 62, and 64 are provided in outer leg 42, inner leg 46, and bottom wall 52 of locking member 50, respectively, for the reception of a bolt 70. A nut 72 when tightened upon threads 74 of the bolt will urge the outer end of lower leg 46 toward upper leg 42, that is, from the position illustrated in FIG. 6 to the position illustrated in FIG. 7.

As the outer end of the lower leg is thus raised or moved toward upper leg 42, the bearing surface 56 of the locking member will be advanced toward outer leg 44 of the loop and into engagement with knurled portion 26 of the handlebar for securely, though releasably, locking the handlebar in adjusted position relative to stem 40.

It will be noted that the overall width of the locking member is such as to permit the side walls thereof to be loosely disposed between the depending side walls 43 of upper leg 42 if not before, in any event after the member has been advanced into locking position with knurled portion 26 of the handlebar.

With particular reference now to FIGS. 6 and 7, it will be noted that the locking member serves to close throat Q.

The locking member of FIG. 9 differs from that of FIG. 5, primarily in that the bearing surfaces 56 are pointed or angular, rather than rounded or slightly arcuate, as in FIG. 5. The locking members of FIGS. 5 and 9, as illustrated in FIGS. 7 and 8, respectively, provide what can best be described as a four-point contact between bearing surfaces 56 and the knurled portion 26 of the handlebar.

In FIGS. 10 and 11 the bearing surface 56 comprises a substantially arcuate surface which is the substantial complement of the outer knurled portion 26 of the handlebar, said arcuate surface being knurled or provided with a plurality of horizontal V's, as clearly illustrated in FIG. 11.

FIG. 13 discloses a bushing 80, having a first or upper cylindrical portion 82 and a second or lower cylindrical portion 84 of a larger diameter for providing a shoulder 86.

With reference now to FIG. 12, it will be noted that cylindrical portion 82 is dimensioned to be received with bolt-receptive apertures 62 and 64 for thereby "lining" said apertures, and wherein shoulder 86 abuts lower surface 83 of the lower leg 46. Bushing 80, when utilized as illustrated in FIG. 12, with any one of the locking members effectively precludes damage to threaded portions 74 of bolt 70, incident to the advance of nut 72 along the bolt for moving lower leg 46 toward upper leg 42.

With reference now to FIGS. 15, 16, and 17, the numeral 90 designates a cam plate having a bolt-receptive aperture 92 therethrough and wherein its forward edge 94 is provided with a pair of laterally spaced slots, each of which are sufficiently wide to loosely receive an upstanding portion 97 of the side walls 54, the front edges of which are provided with a bearing or forwardly projecting locking portion 95. The bottom wall 52 is provided with an elongate bolt-receptive aperture 98 for permitting endwise movement of the locking member relative to the undersurface of cam plate 90 during those periods of time when the lower leg 46 is being urged toward upper leg 42.

After the knurled portion 26 of a handlebar has been seated within the loop defined by upper, outer and lower legs 42, 44, and 46, the locking member of FIG. 17 is introduced into the throat with cam plate 90 loosely associated with the locking member with upstanding portions 97 seated within slots 96.

Uniformly satisfactory results have been obtained in those instances in which the overall length of elongate aperture 98 is at least one and one half times the O.D. of bolt 70.

After bolt 70 is inserted through the respective bolt-holes and nut 72 is tightened on thread 74 of the bolt, the locking member 50 and cam plate 90 will be lifted as lower leg 46 is moved toward upper leg 42 until such time as lower edge 47 of depending side walls 43 of upper leg 42 engage the upper surface of the cam plate, as illustrated in FIG. 15. Further, movement of lower leg 46 with respect to upper leg 42 will result in the locking member being advanced forwardly by reason of relative motion between inclined cam surface 93 of side walls 54 and with the end or bottom walls 100 of slots 96. This forward movement of the locking member will result in bearing points 95 being embedded in the knurled portion 26 of the handlebar. It will be understood that end or bottom walls 100 comprise cam followers of the cam plate.

The locking member illustrated in FIG. 18 is similar to and interchangeable with the locking members of FIGS. 5, 9, and 11. This figure has been included for the purpose of indicating that the various locking members, aforesaid, can, if desired, be fabricated as a single, solid member, rather than of substantial U-shaped formation, as illustrated in FIGS. 5, 9, and 11.

With particular reference now to FIGS. 6–8, 10, 12, and 14, it should be noted that the forwardly facing arcuate bearing surface 45 of the depending side walls 43, is shaped whereby to substantially conform to the outer cylindrical surface of knurled portion 26 of the handlebar, and that the arcuate bearing surface 45 defines with the inner surface of rounded, outer leg 44, a bearing area which embraces approximately 225° of the outer circumference of knurled portion 26, before the locking member has been tightened, see FIG. 6, and wherein said bearing area approximates 270° of the said outer circumference after the locking member has been fully advanced as in FIG. 7.

It should be further noted that the forwardly facing bearing surfaces of the locking members are characterized by one or more forwardly projecting abutments, such as 56 and 95, each of which engage and are embedded into the knurled portion 26 at locations between the depending side walls 43, thereby providing a positive locking relationship between the handlebar and bicycle stem, since the forces which are transmitted to knurled portion 26 by the locking members are such as to urge the knurled portion tightly against the loop defined by legs 42, 44, and 46, and bearing surfaces 45 of the depending side walls 43.

What is claimed is:

1. A bicycle stem comprising an elongate barrel, the upper end which terminates in a forwardly projecting, integral U-shaped loop defined by an upper, an outer, and a movable lower leg disposed in spaced relationship with said upper leg defining therewith an open throat through which a bicycle handlebar can pass, said upper leg having depending leg side walls thereon; a locking member removably seated on said lower leg to be spaced apart from said upper leg and disposed in said throat between said upper and lower legs; said locking member having a base and member side walls; said upper and lower legs and said locking member each having a bolt-receptive aperture therethrough; a bolt passing through said bolt-receptive apertures; and means for tightening the bolt to advance the lower leg toward the upper leg and simultaneously advance the locking member toward the outer leg of the loop with said locking member side walls loosely disposed between said leg side walls.

2. A stem as called for in claim 1, wherein forwardly facing bearing surfaces of the locking member are characterized by one or more forwardly projecting abutments.

3. A bicycle stem for a handlebar of the type which includes a pair of risers which extend from opposite ends of a central, cylindrical, knurled mounting portion and a transverse strut or brace bar spanning said risers, said stem comprising an elongate barrel, the upper end of which terminates in a forwardly projecting U-shaped loop, defined by an upper, an outer, and a movable lower leg disposed in spaced relationship with respect to said upper leg defining an open throat of such a dimension as to permit the free, unobstructed passage therethrough of the transverse strut or brace bar incident to advancement of the loop of the stem along a riser for disposing the central, knurled mounting section of the handlebar in the U-shaped loop of the stem, said upper leg having depending leg side walls thereon, and locking means removably seated on said lower leg to be spaced apart from said upper leg for anchoring the knurled mounting portion of the handlebar in said loop against accidental or unintentional relative movement therewith, said legs and said locking member each having a bolt-receptive aperture therethrough, a bolt passing through said bolt receptive apertures, means for tightening said bolt to advance said lower leg toward said upper leg and simultaneously advance said locking member toward said upper leg of said loop, said locking means being located in said open throat between said upper and lower legs and having a base and member side walls, said leg side walls receiving said locking member therebetween.

4. A mounting stem for a handlebar of the type which includes a pair of risers which extend from opposite ends of an elongate, central, cylindrical, knurled mounting section, and a transverse strut or brace bar spanning said risers; said stem comprising an elongate barrel, the upper end of which terminates in a forwardly projecting U-shaped loop defined by an upper, an outer and a movable lower leg disposed in spaced relationship with respect to said upper leg and defining therewith an open throat providing access to the interior of said U-shaped loop, said upper leg having a pair of depending leg side walls, said throat being dimensioned to facilitate passage of a transverse strut or brace bar therebetween incident to the advancement of the U-shaped loop along a riser toward the central section for disposing the central mounting section of the handlebar within said U-shaped loop; a handlebar locking member removably seated on said lower leg to be spaced apart from said upper leg and disposed between said upper and lower legs, said member including a base, member side walls and a forward gripping surface engageable with the cylindrical, central, knurled mounting section of the handlebar; and means for drawing the lower leg of said U-shaped loop toward the upper leg for advancing the locking member toward and for disposing the gripping surface thereof in locking relationship with the knurled section of the handlebar for securely, though releasably, anchoring said handlebar within the U-shaped loop against accidental or unintentional relative movement therewith and locating said locking member so that said member side walls are received between said leg side walls.

5. A stem as called for in claim 4, wherein said upper and lower legs and the locking means each have a bolt-receptive aperture therethrough; a bolt passing through said bolt-receptive apertures; a nut engageable with said bolt, said bolt and nut comprising the means for drawing the lower leg of said U-shaped loop toward the upper leg.

6. A mounting stem as called for in claim 4, wherein the locking member is substantially U-shaped, comprising a bottom wall and a pair of laterally spaced, upstanding side walls each of which includes a forward portion which defines a gripping surface, a downwardly inclined intermediate portion which defines a cam surface, and a rear portion which defines a support surface; a substantially flat cam plate spanning said upstanding side walls and having a pair of laterally spaced cam-followers in the front edge thereof dimensioned to receive and engage the cam surfaces of the locking member; the upper and lower legs of the U-shaped loop and the cam plate each having a bolt-receptive aperture therethrough; the bottom wall of the locking member having an elongate aperture therethrough; a bolt passing through each of said apertures; a nut engagable with said bolt; said nut and bolt comprising the means for drawing the lower leg of the U-shaped loop toward the upper leg while advancing the locking member relative to the cam plate and said lower leg.

7. A mounting stem as called for in claim 6, wherein the length of the elongate aperture is at least one and one half times the O.D. of the bolt.

8. A mounting stem as called for in claim 6, wherein the upper leg of the U-shaped loop includes a pair of integral, laterally spaced, depending side walls, each of which include a lower bearing surface which terminates in a forwardly facing, arcuate, bearing surface, the cam followers of the cam plate being recessed and comprising the end wall of a pair of slots the side walls of which loosely engage the sides of the intermediate portion of the locking member, and wherein the width of the cam plate is such as to span the lower bearing surface of said depending side walls for disposing the upper surface of the cam plate in abutment with each of said lower bearing surfaces, and further wherein upward movement of the lower leg of the U-shaped loop urges the inclined cam surface of the locking member against and along the cam followers of the cam plate, thereby advancing the locking member toward the outer leg of the U-shaped loop.

9. A stem as called for in claim 4, wherein the locking member is substantially U-shaped and has a forward gripping surface defined by forwardly extending projections which are adapted to become embedded in the knurled mounting section of the handlebar and further includes a bottom wall and a pair of laterally spaced upstanding side walls, the forward end of each of which terminate in said forwardly extending projections.

10. A stem as called for in claim 4, wherein the forward gripping surface is substantially arcuate and defined by a plurality of transverse projections, each of which define one of a plurality of cutting edges which are adapted to be embedded in the knurled mounting section of a handlebar.

* * * * *